United States Patent [19]

Kondoh et al.

[11] Patent Number: 5,058,978
[45] Date of Patent: Oct. 22, 1991

[54] OPTICAL DIVIDER FOR MULTIMODE OPTICAL FIBER SYSTEMS

[75] Inventors: Osamu Kondoh; Mitsuzo Arii; Tohru Nakajima; Yasunari Kawabata, all of Tokyo, Japan

[73] Assignee: Mitsubishi Gas Chemical Co., Inc., Tokyo, Japan

[21] Appl. No.: 600,939

[22] Filed: Oct. 22, 1990

[30] Foreign Application Priority Data

Oct. 25, 1989 [JP] Japan ................................. 1-275903

[51] Int. Cl.$^5$ .............................................. G02B 6/26
[52] U.S. Cl. ...................................... 385/43; 385/46; 385/48; 385/130
[58] Field of Search ................. 350/96.12, 96.15, 96.16

[56] References Cited

U.S. PATENT DOCUMENTS

| | | | |
|---|---|---|---|
| 4,535,440 | 8/1985 | Mannschke | 350/96.15 X |
| 4,678,267 | 7/1987 | Burns et al. | 350/96.15 |

FOREIGN PATENT DOCUMENTS

| | | | |
|---|---|---|---|
| 55-110206 | 8/1980 | Japan | 350/96.15 |
| 56-3522 | 1/1981 | Japan . | |
| 57-157207 | 9/1982 | Japan | 350/96.15 |
| 62-69205 | 3/1987 | Japan . | |
| 62-183405 | 8/1987 | Japan . | |
| 2169096 | 7/1986 | United Kingdom | 350/96.15 |

OTHER PUBLICATIONS

Okuda et al., "Planar Gradient-Index Glass Waveguide and Its Applications to a 4-Port Branched Circuit and Star Coupler", Applied Optics, vol. 23, No. 11, p. 1745, Jun. 1, 1984.
Yamada et al., "Optical-Fibre Coupling to High-Silica Channel Waveguides with Fibre-Guiding Grooves", Electronics Letters, vol. 20, No. 8, p. 313, Apr. 12, 1984.
Kurokawa et al., "Polymer Optical Circuits for Multimode Optical Fiber Systems", Applied Optics, vol. 19, No. 18, p. 3124, Sep. 15, 1980.

*Primary Examiner*—John D. Lee
*Attorney, Agent, or Firm*—Sughrue, Mion, Zinn, Macpeak & Seas

[57] ABSTRACT

A main optical waveguide portion and/or branching optical waveguide portions of the optical waveguide is tapered in such a way so as to expand towards the output side for reducing a coupling loss due to mismatching of numerical apertures N.A. between optical fibers and the optical waveguide, wherein the light entering the optical waveguide at an angle determined by the numerical aperture N.A. of the optical fiber gradually reduces its angle of incidence to an interface of the core and cladding as it passes by a portion where the taper is provided and when the light reaches the output side of the optical fiber, the numerical aperture N.A. thereof is effectively reduced to a value which is lower than the numerical aperture N.A. determined by a difference of refractive-indices in the optical waveguide. By making the numerical aperture N.A. of the optical waveguide a little greater than that of the optical fiber, it is possible to reduce the loss at the input side as well as the loss at the output side simultaneously, and further, the taper need not necessarily be a straight taper but a curved taper also can be used.

9 Claims, 5 Drawing Sheets

OPTICAL DIVIDER FOR MULTIMODE OPTICAL FIBER SYSTEMS

BACKGROUND OF THE INVENTION

1. Field of the Invention

This invention relates to an optical device in optical communication systems more particularly, to a single directional optical divider with low loss for distributing an input light to a plurality of optical systems by employing an optical waveguide.

2. Description of the Prior Art

An optical divider is an important device for use in distributing an input light to a plurality of optical systems in optical communication systems or optical data link systems, and there are several types of optical dividers such as a micro-optics type, a fused fiber type and an optical waveguide type. Above all, an optical divider of the optical waveguide type has excellent properties such that full of flexibility in designing, easy to obtain multi-branching circuits, suitable for mass-production and so forth. Accordingly, it has been studied for making practical use of such optical dividers and various propositions have been made heretofore.

An optical divider which employs a thick film optical waveguide for use in multimode fiber systems has such a structure as shown in FIG. 1 wherein an input optical fiber 3 and a plurality of output optical fibers 4 are closely coupled to the opposite ends of a light transmissible substrate 1, in which substrate 1 an optical waveguide 2 is formed by a technique of photolithography or the like, so that the light entering from the input optical fiber 3 is distributed and coupled to the plurality of output optical fibers 4 by means of the optical waveguide 2. More practically, the light transmissible substrate 1 has a further reinforced structure 6 and is connected and secured by utilizing a bonding agent 7, which also acts as a refractive-index matching member, to a fiber array 5 composed of optical fibers being aligned and secured to each other.

One of the most important properties of an optical divider produced in this manner is an optical loss, and it is a very important subject for the practical use of an optical device how to reduce the optical loss.

The optical loss is divided roughly into two types of losses, one of which is a transmission loss encountered in transmitting a light signal through an optical waveguide and the other of which is a coupling loss to be caused when coupling an optical fiber to the optical waveguide. The coupling loss is further divided into two types of losses, one of which is a shape loss derived from the difference in cross sectional shapes between the optical waveguide and the optical fiber core and the other of which is a loss derived from mismatching of numerical apertures (N.A.) between the optical waveguide and the optical fiber.

Accordingly, in order to fabricate the optical divider having low optical losses, it is necessary to check every factor relating to the losses and reduce them as much as possible.

The transmission loss depends on a material of which the optical waveguide is made and a method of fabricating the optical waveguide, however, these are not called in question herein.

The shape loss is derived from the difference in cross sectional shapes such as when the optical fiber core is of circular cross section while the optical waveguide is of other than the circular cross section. Besides an optical waveguide fabricated by an ion migration method for multi-component glass through diffusion process (E. Okuda et al., Appl. Opt., 23, 1745, (1984)), such an optical waveguide as a quartz glass waveguide fabricated by a flame deposition method (Y. Yamada et al., Electron Lett., 20, 313 (1984)) or a high polymer waveguide fabricated by a selective photopolymerization method (T. Kurokawa et al., Appl. Opt., 19, 3124 (1980)) has a substantially rectangular cross section, and thereby causing optical losses at a coupling portion with the optical fiber having a circular cross sectional core. For example, a 4-port branched circuit which includes a connection of 2-port branched circuits in which each core has an equal width is shown in FIG. 2A.

Where such contrivance is made in circuit construction upon designing a circuit, so far as it is used as an optical divider, if an optical waveguide is formed into the same circular shape as that of the optical fiber, an optical divider having no optical loss may be provided ideally (if it is used as a mixer in the opposite direction, inherent loss of 3 dB may take place at each of mixing parts). However, if an optical waveguide has a rectangular cross section, a coupling portion of the optical waveguide against an optical fiber derives the coupling loss from each of hatched portions of FIG. 2A at where the input light from the input optical fiber core 3A is not received by the optical waveguide core 2. While, at the output side, the output light from the optical waveguide core 2 shown by hatching in FIG. 2A is not received by an output optical fiber 4A, thus resulting in the coupling loss.

In such circuit structure, it is known that the overall coupling losses at the input side and the output side can be minimized by optimizing the thickness and width of the optical waveguide (T. Kurokawa et al., Appl. Opt., 19, 3124 (1980)). In the case of Step-index (SI) optical fibers, the minimum shape loss of 0.8 dB is achieved by shaping the optical waveguide into such that a side of the cross section of which equals to 90% of a core diameter of the optical fiber to be connected.

If an optical divider is formed into a circuit structure such as shown in FIG. 2B by making use of properties that can be used for a single directional transmission of light signal, it is possible to reduce the shape loss. That is, if the optical divider is fabricated in such a manner as to form an optical circuit which is composed of a main optical waveguide 2A for being coupled to an input optical fiber 3 and branching optical waveguides 2B having contiguity to the main optical waveguide 2A for being coupled to a plurality of output optical fibers 4, it is possible to make, at the input side, the width of the optical waveguide sufficiently wider than a core diameter of the input optical fiber at the input side and that, at the output side, the width of the optical waveguide sufficiently narrower than a core diameter of the output optical fiber to be connected. With this circuit arrangement, the shape loss to be caused in the optical circuit structure shown in FIG. 2A can be eliminated substantially.

While such circuit structure has some disadvantages such that, particularly when branching waveguides are great in number, the width of the main optical waveguide becomes wide correspondingly and results in a change for the worse in loss variance. However, such defect may be improved or eliminated by selecting the length of the main optical waveguide as well as the widths of branched optical waveguides suitably.

As described in detail above, while the shape loss in the coupling loss of the optical divider can be reduced significantly by selecting a suitable circuit structure, however, the loss derived from the mismatching of numerical apertures between the optical waveguide and the optical fibers still remains. In FIG. 3, there is shown that how the coupling loss is derived due to mismatching of numerical apertures N.A., wherein an angle of emission from a core 8A of a light transmissible medium 8 is represented by $\theta_1$ and an angle of incidence to another light transmissible medium 9 coupled to the light transmissible medium 8 is represented by $\theta_2$. In the case of $\theta_1 > \theta_2$, lights between the hatched portions of FIG. 3 can not be received by the light transmissible medium 9, thus resulting in a radiation mode and causing a coupling loss.

On the contrary, in the case of $\theta_2 > \theta_1$, all incident lights remain within the angle of incidence, this results in no coupling loss. The numerical aperture N.A. of each light transmissible medium is given by a sine of the angle of emission (or the angle of incidence) N.A.=sin $\theta$ from its definition. The actual coupling loss derived from the mismatching of the numerical apertures between the optical fiber and the optical waveguide is given by the following formula:

$$\text{Coupling loss (dB)} = |10 \log(N.A._{WG}/N.A._{fiber})^2| \quad (1)$$

where, $N.A._{WG}$ is a numerical aperture of the optical waveguide, whereby a geometric mean value is used when the numerical aperture differs in a lateral direction and a vertical direction of the film as in a case that the optical waveguide is fabricated by a selective photopolymerization method, and $N.A._{fiber}$ is a numerical aperture of the optical fiber.

As it is apparent from the formula (1), the loss derived from the mismatching of the numerical apertures becomes zero when the numerical aperture of the optical waveguide coincides with that of the optical fiber. On the other hand, when refractive-indices of a core and cladding of the optical fiber are designated by $n_{core}$ and $n_{clad}$, respectively, the numerical aperture N.A. is related to those indices in accordance with:

$$N.A. = (n_{core} - n_{clad})^{\frac{1}{2}} \quad (2)$$

accordingly, it can be seen that, in order to achieve the matching of the numerical apertures N.A., the refractive-indices of the core and clad of the optical waveguide must be controlled accurately. However, the control of the refractive-indices is not always easy. If it is assumed that the numerical aperture of the optical waveguide which has actually fabricated is 5% smaller than that of the optical fiber, a coupling loss of 0.45 dB may be caused at the input side in accordance with the formula (1). In view of the control accuracy of the refractive-index, in a conventional method of fabricating an optical waveguide, the accuracy of 5% for the numerical aperture N.A. is proximate to the control unit and there caused is a loss of 0.5 dB or so in times, thus resulting in a deterioration of optical properties of the optical divider.

It is therefore an object of the present invention is to provide an optical divider being reduced in coupling loss to be derived from the mismatching of numerical apertures and having a low optical loss.

SUMMARY OF THE INVENTION

After making an earnest examination and efforts to reduce the coupling loss being derived from the mismatching of numerical apertures N.A. of an optical divider and an optical fiber and the optical loss of the optical divider, it has been found that the coupling loss due to the mismatching of the numerical apertures N.A. can be reduced considerably if either the main optical waveguide 2A or the branching optical waveguides 2B of the optical circuit of FIG. 2B has such an optical waveguide structure as shown in FIG. 4A or FIG. 4B, wherein the optical waveguide is tapered in such a way as it expands towards the output side, and the present invention is based on this fact. In particular, as shown in FIG. 5, the light entering the optical waveguide at an angle determined by a numerical aperture N.A. of the optical fiber gradually reduces its angle of incidence to an interface of the core and cladding as it passes by a portion 2C where the taper is provided. When the light reaches to the optical fiber at the output side, the numerical aperture N.A. thereof is effectively reduced to a value which is lower than the numerical aperture N.A. determined by a difference of refractive-indices in the optical waveguide. By making the numerical aperture N.A. of the optical waveguide little greater than that of the optical fiber, it is possible to reduce the loss at the input side as well as the loss at the output side simultaneously. In embodying the present invention, the taper need not necessarily be a straight taper but a curved taper as shown in FIG. 4B may also be employed. Further, the portion where the taper is provided may be at either one or both of the main optical waveguide and the branching optical waveguides.

DETAILED DESCRIPTION OF THE PREFERRED EMBODIMENTS

Embodiments of the present invention will be described in detail with reference to accompanying drawings.

Figure 1:
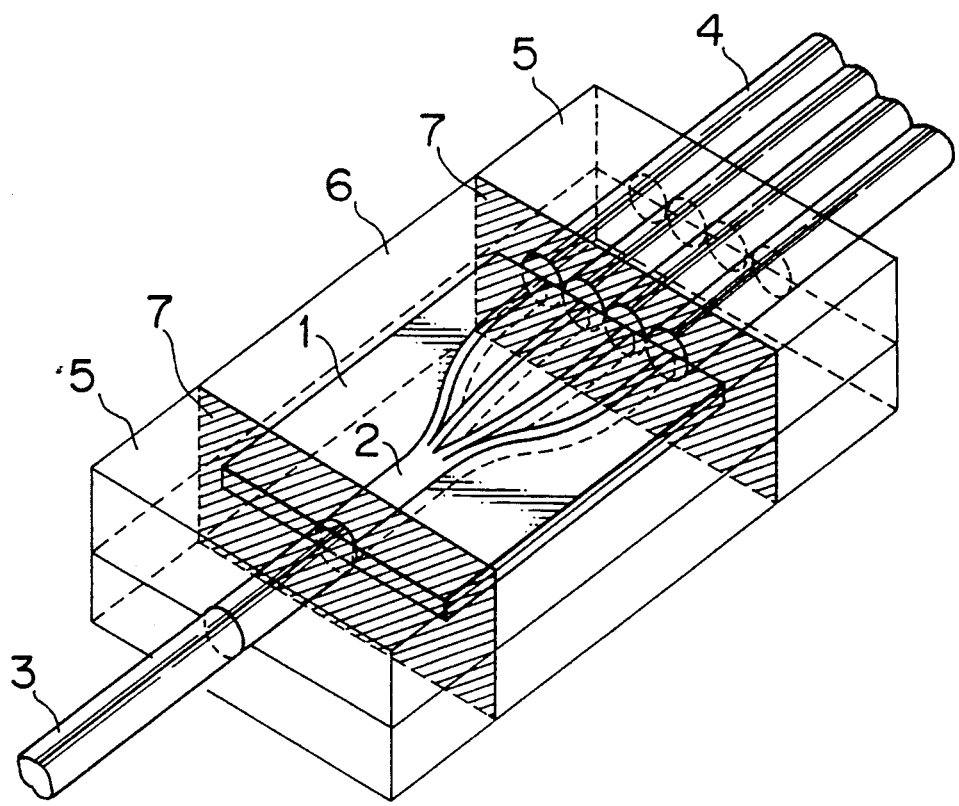
FIG. 1 is a perspective view of an optical divider produced by a selective photopolymerization method.
Figure 2A:
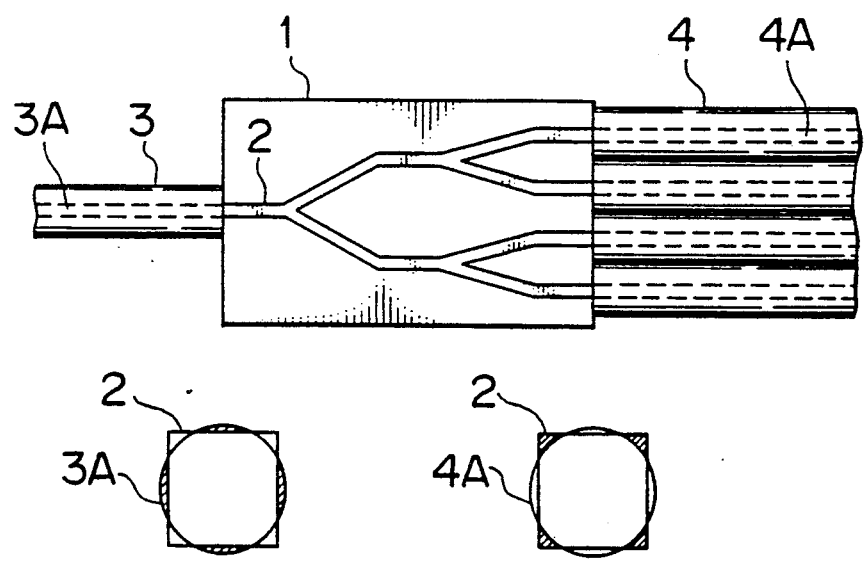
FIG. 2A is a plan view of an optical divider showing a branched circuit composed of optical waveguides with constant width and a state of connecting portion between optical waveguides and optical fibers.
Figure 2B:
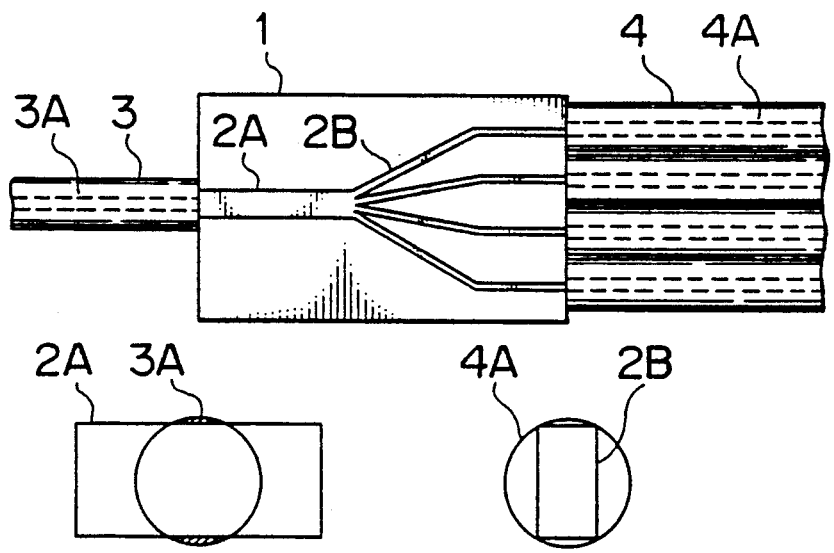
FIG. 2B is a plan view of an optical divider showing a branched circuit composed of optical waveguides divided equally from a main optical waveguide and a state of connecting portion between the optical waveguides and the optical fibers.
Figure 3:
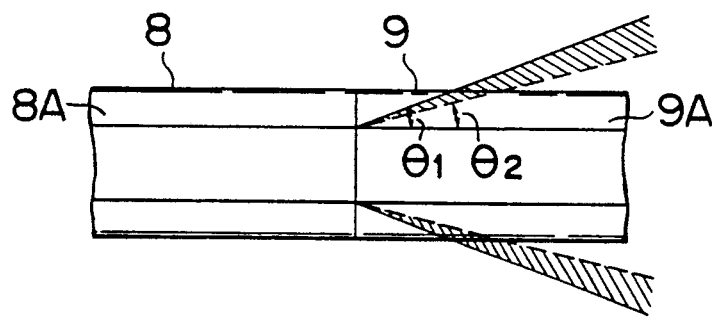
FIG. 3 is a schematic diagram showing the relationship between the transmission and reception of light whereby two media having different numerical apertures are connected to each other.
Figure 5:
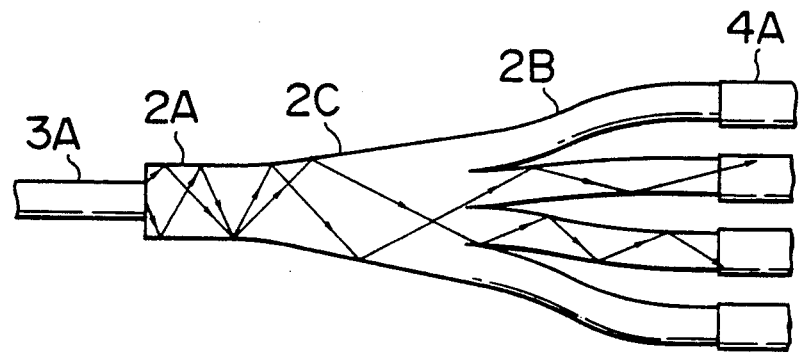
FIG. 5 is a principle diagram showing paths of light beams passing through a tapered portion of the optical divider.
Figure 4A:
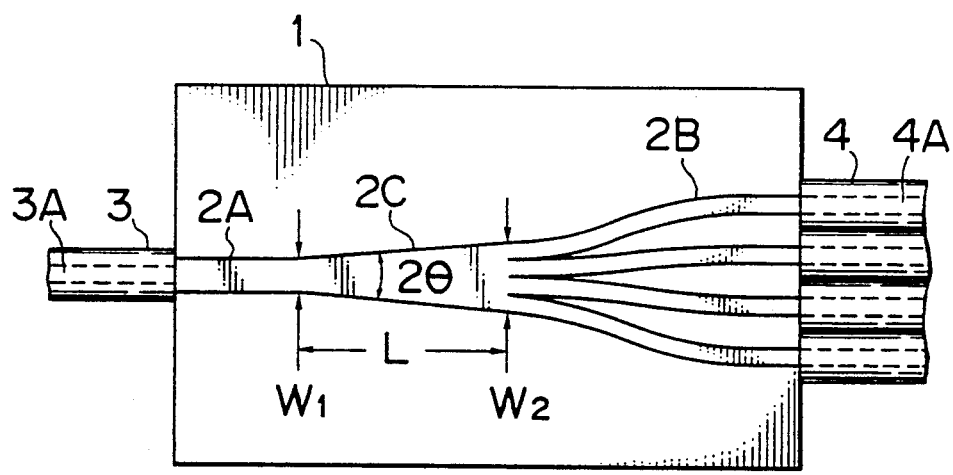
FIG. 4A is a plan view of a principal circuit construction of the present invention showing a circuit construction provided with a taper at the main optical waveguide.

FIG. 4A is an embodiment of the present invention showing an optical divider (1×4 divider). While various techniques are available for making an optical waveguide 2 within a light transmissible substrate 1, a selective photopolymerization method was employed herein (Japanese Patent Publication No. 56-3522). In particular, a film of desired thickness containing a polycarbonate resin ("Iupilon Z", a trade name of a product by "Mitsubishi Gas Kagaku Kabushiki Kaisha") synthesized from Bisphenol-Z, methyl acrylate which is a monomer having a low refractive-index, an optical sensitizer and some others is produced by a solvent cast method. The film is then exposed to ultra-violet rays through a photomask carrying a printed circuit pattern for polymerizing the monomer in exposed portions other than the printed circuit pattern to form an optical waveguide therein. It is noted that, since the effect of the present invention is materialized by providing a flat optical waveguide with a taper in width, it does not rely upon a method of fabricating the optical waveguide, and the present invention can be embodied similarly by employing any other method of fabricating the optical waveguide other than the method employed herein.

In order to define the structure of the taper, it is necessary to designate three parameters including a circuit width $W_1$ at a portion where the taper starts, another circuit width $W_2$ at another portion where the taper ends and thereby a taper angle is $\theta$. While it is possible to reduce the shape loss by providing the dividing circuit with the main optical waveguide and branching optical waveguides as described in detail hereinabove, however, it is necessary for the optical waveguide that an increase of the shape loss should not be introduced by the tapered portion. The ranges of the widths $W_1$ and $W_2$ are defined in view of the above consideration.

Firstly, after various examinations have been made as to the relationship between the width of the optical waveguide and the coupling loss with regard to the shape loss at the output side between the optical waveguide and the output optical fiber, it was found that the shape loss can be reduced substantially to zero by making the width of the optical waveguide at or less than 85%, desirably 80%, of a core diameter D of the optical fiber. Since the optical waveguide provided by the selective photopolymerization method employed or the flame deposition method has a distribution of refractive-index which is close to that of a step-index (SI) type, and thereby if the output optical fibers are of graded-index (GI) type, the shape loss may become substantially little greater than that of SI type. However, if the width of the optical waveguide is arranged to be at or less than 80% of the core diameter of the optical fiber, the shape loss can be neglected regardless of the index type (GI or SI) of the output optical fiber.

Secondly, at the input side, if the width of the optical waveguide is arranged to be greater than the core diameter of the optical fiber, the shape loss can be reduced to zero.

The two arrangements as described above are the essential requirements for the present invention in order to obtain an optical circuit which is free from the shape losses both at the input side and the output side of the optical waveguide. The lower limit of the width $W_1$ and the upper limit of the width $W_2$ are determined from the condition as described above. In an N-port optical divider, generally, the width $W_1$ is $W_1 > D$, while the $W_2$ is $W_2 < 0.85$ DN.

Figure 6:
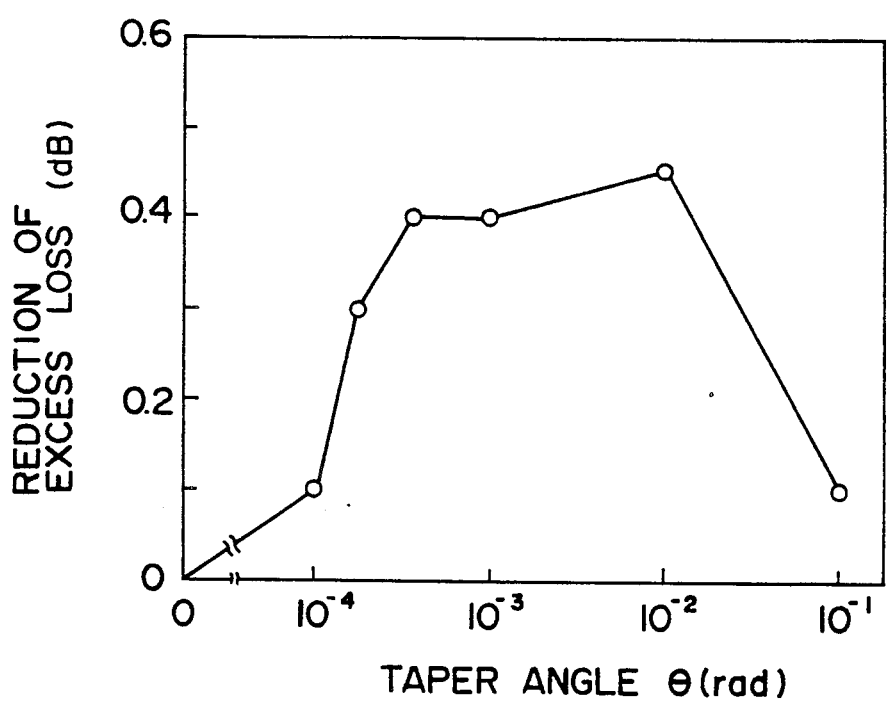
FIG. 6 is a diagram showing the reduction of excessive loss when a taper angle is varied in a 4-port branching circuit embodying the present invention.

The optical losses have been measured with various optical circuits by varying the taper angle $\theta$ (or a taper length L) to various values while maintaining dimensions of $W_1 = 50$ μm, $W_2 = 100$ μm, and the film thickness $= 40$ μm under use of the optical fiber 3 having 50/125GI (N.A. $= 0.20$). In FIG. 6, it is shown how an excess loss is improved by providing a taper for the optical waveguide as compared with that of the optical waveguide, as a standard, with no taper ($\theta = 0$). The effect of the taper is indicated from the proximity of a point where the taper angle exceeds $10^{-4}$ (rad), and a constant improvement of 0.4 dB is attained from the proximity of a point of $4 \times 10^{-4}$ (rad) through the proximity of a point of $10^{-2}$ (rad). The effect of the taper angle can not be seen beyond the point of $10^{-2}$.

By taking into consideration of the fact that the effective reduction of the numerical aperture is caused by reflections at the tapered portion of the optical waveguide, a taper angle greater than an angle of incidence determined by the numerical aperture N.A. of the input optical fiber is considered to be of insignificance, while, if the taper angle is too small, a length of the tapered portion becomes too long, increasing a transmission loss, thus resulting in cancellation of the effect of the taper. A range of the taper angle within which the tapering is effective is obtained from FIG. 6 as:

$$2 \times 10^{-4} < \theta(\text{rad}) < 4 \times 10^{-2} \tag{3}$$

Since the upper limit is varied in response to a numerical aperture of an optical fiber in use, the formula (3) may be given more commonly by:

$$2 \times 10^{-4} < \theta < (\sin^{-1} NA)/4 \tag{4}$$

Figure 4B:
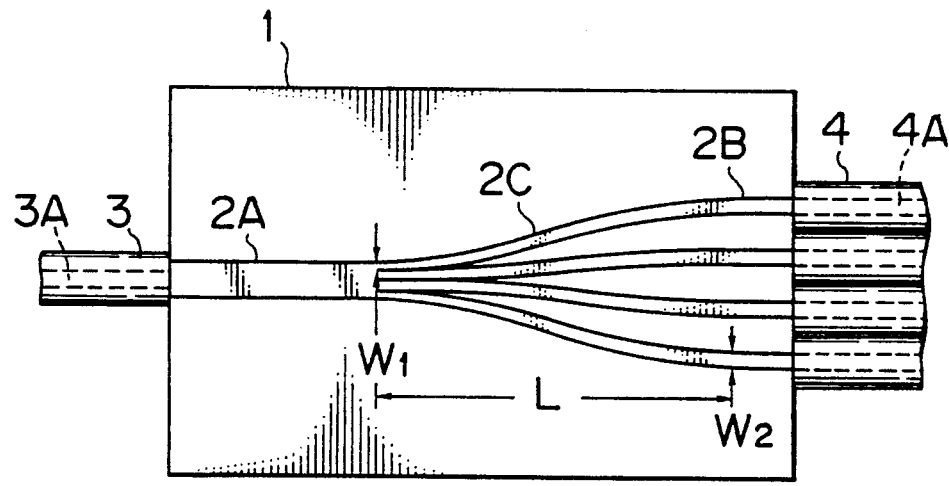
FIG. 4B is a circuit construction provided with a taper at each of the branching optical waveguides.

Also, in the case of the circuit construction of FIG. 4B wherein the taper is provided for each of branching waveguides, the formula (4) stands quite similarly if an apparent taper angle $\theta$ is defined by the formula (5):

$$\theta = \tan^{-1}(W_2 - W_1/2L) \tag{5}$$

According to the present invention, the coupling loss derived from the mismatching in numerical aperture can be reduced irrespective of the accuracy of numerical aperture control in fabricating an optical waveguide.

As it has been described above, according to the present invention, the coupling loss to be derived from the mismatching of numerical apertures between the optical waveguide and the optical fibers can be reduced considerably by merely changing the optical circuit structure in such a way as to be composed of a main optical waveguide and branching waveguides and making it a tapered structure. Accordingly, the optical divider of reduced losses can readily be fabricated even if there were variations in the production of optical waveguides.

Although the present invention has been described in detail with reference to the presently-preferred embodiments, it should be understood by those of ordinary skilled in the art that various modifications can be made without departing from the spirit and scope of the invention. Accordingly, the invention is not to be limited except as by the appended claims.

What is claimed is:

1. An optical divider comprising:
   a flat light transmissible plate member having first and second ends and an optical waveguide formed therein;
   an input optical fiber closely contacting and joining said first end of said flat light transmissible plate member in which said optical waveguide is formed; and
   a plurality of output optical fibers closely contacting and joining said second end of said plate member for distributing input light from said input optical fiber to said plurality of output optical fibers, wherein
   said optical waveguide has a tapered structure that expands towards an output side and is formed of a main waveguide portion coupled with said input optical fiber and branching optical waveguide portions contiguous to said main optical waveguide portion and coupled to said plurality of output optical fibers; and
   wherein said optical waveguide is formed so as to satisfy the following conditions when a core diameter and a numerical aperture of said input and output optical fibers are represented by D and N.A. respectively,
   (1) a width of a portion of said main optical waveguide where said portion is coupled with said input optical fiber is greater than D while each width of portions of said branching optical waveguide where said portions of said branching optical waveguide are coupled with said output optical fibers is smaller than 0.85 D, and
   (2) the range of the taper angle $\theta$ of the optical waveguide is given by:

$$2\times 10^{-4} < \theta(\text{rad}) < (\sin^{-1} \text{N.A.})/4.$$

2. An optical waveguide as defined in claim 1, wherein the main optical waveguide portion is tapered so as to increase in width in a direction towards a branching side.

3. An optical waveguide as defined in claim 1, wherein each branching optical waveguide portion is tapered so as to increase in width in a direction towards the output side.

4. An optical waveguide as defined in claim 1, 2 or 3, wherein said taper is linear.

5. An optical waveguide as defined in claim 1, 2 or 3, wherein said taper is curved.

6. An optical waveguide as defined in claim 1, wherein said output optical fibers are formed into an array and secured to a substrate by a bonding agent.

7. An optical waveguide as defined in claim 1, wherein the output optical fibers are of graded-index type.

8. An optical waveguide as defined in claim 1, wherein the output optical fibers are of step-index type.

9. An optical waveguide as defined in claim 1, wherein said optical waveguide is formed within a polymer film.

* * * * *